United States Patent
Fanning

(10) Patent No.: US 6,496,894 B1
(45) Date of Patent: Dec. 17, 2002

(54) METHOD FOR ENFORCING DEVICE CONNECTION POLICIES

(75) Inventor: Blaise B. Fanning, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/421,447

(22) Filed: Oct. 19, 1999

(51) Int. Cl.[7] .............................................. G06F 13/34
(52) U.S. Cl. ........................ 710/305; 710/104; 710/105
(58) Field of Search .................................. 710/305–317

(56) References Cited

U.S. PATENT DOCUMENTS

| | | | | |
|---|---|---|---|---|
| 5,616,968 A | * | 4/1997 | Fujii et al. ................... | 307/150 |
| 5,627,842 A | * | 5/1997 | Brown et al. ................ | 714/720 |
| 6,141,021 A | * | 10/2000 | Bickford et al. ............ | 345/503 |
| 6,249,831 B1 | * | 6/2001 | Allingham ................... | 710/312 |
| 6,292,859 B1 | * | 9/2001 | Santiago ...................... | 710/10 |
| 6,330,639 B1 | * | 12/2001 | Fanning et al. ............. | 365/222 |

* cited by examiner

Primary Examiner—Rupal Dharia
(74) Attorney, Agent, or Firm—Blakely, Sokoloff, Taylor & Zafman LLP

(57) ABSTRACT

A method and apparatus of enforcing a connection policy of a system controller is disclosed. In one embodiment, the method and apparatus monitor multiple distinct device identifications on a bus connected to the system controller. When more than a threshold number of the device identifications have been identified on the bus, the method and apparatus proceed to disable the system controller.

20 Claims, 5 Drawing Sheets

METHOD FOR ENFORCING DEVICE CONNECTION POLICIES

FIELD OF THE INVENTION

This invention relates to computer technologies generally and particularly to system controllers in computer systems.

BACKGROUND OF THE INVENTION

A system controller in an electronic system often interfaces with multiple semiconductor devices and provides appropriate control information. In certain system topologies, the system controller may interface with multiple devices on one of its ports. When too many devices are connected to one port, this can in some cases disrupt temperature stability of the system controller or electrically stress the system controller's interface circuits and may as a result reduce reliability of the system controller or even damage the system controller.

Although some flow control mechanism may in theory ameliorate the mentioned thermal problem, where the system controller would inform the sending devices to suspend transmission for a period of time when the previously described conditions are met, the electrical interface problem cannot be solved in this manner. Specifically, flow controlling a device will not change the fact that the device is indeed connected to a particular interface port, persistently causing it electrical stress.

Thus, a method and apparatus is needed to enforce a connection policy of a system controller to address the described issue.

SUMMARY OF THE INVENTION

A method and apparatus of enforcing a connection policy of a system controller is disclosed. In one embodiment, the method and apparatus monitor multiple distinct device identifications on a bus connected to the system controller. When more than a threshold number of the device identifications have been identified on the bus, the method and apparatus proceed to disable the system controller.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus of enforcing a connection policy of a system controller is described. In the following description, numerous specific details are set forth such as logic gates, etc. in order to provide a thorough understanding of the disclosed method and apparatus. However, it will be apparent to one of ordinary skill in the art that the disclosure may be practiced without these particular details. In other instances, well-known elements and theories, such as system buses, system controllers, registers, logic gates, snoops, etc., have not been discussed in special details in order to avoid obscuring the disclosure.

Additionally, "device identification information" is used interchangeably with "device identification" and with "tag" throughout the written description to refer to a identification relating to a device. However, it is important to note that this device identification information may be generated by the device itself or generated by an agent.

Figure 1:
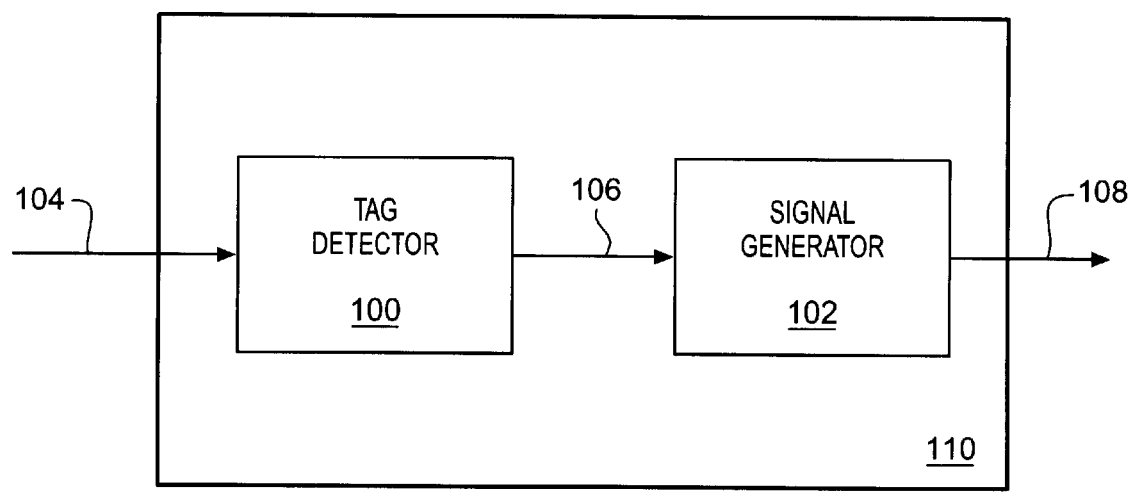
FIG. 1 illustrates a general block diagram of one embodiment of a connection policy generator.

FIG. 1 demonstrates a general block diagram of one embodiment of connection policy generator 110, which comprises tag detector 100 and signal generator 102. Connection policy generator 110 receives input signal 104, which comprises information such as device identification information. Tag detector 100 of connection policy generator 110 examines input signal 104 and generates status signal 106 indicative of the existence and content of device identification information. With status signal 106 as its input, signal generator 102 maintains a number of distinct device identifications it has received and produces disabling signal 108 when the number exceeds a certain threshold.

Figure 2:
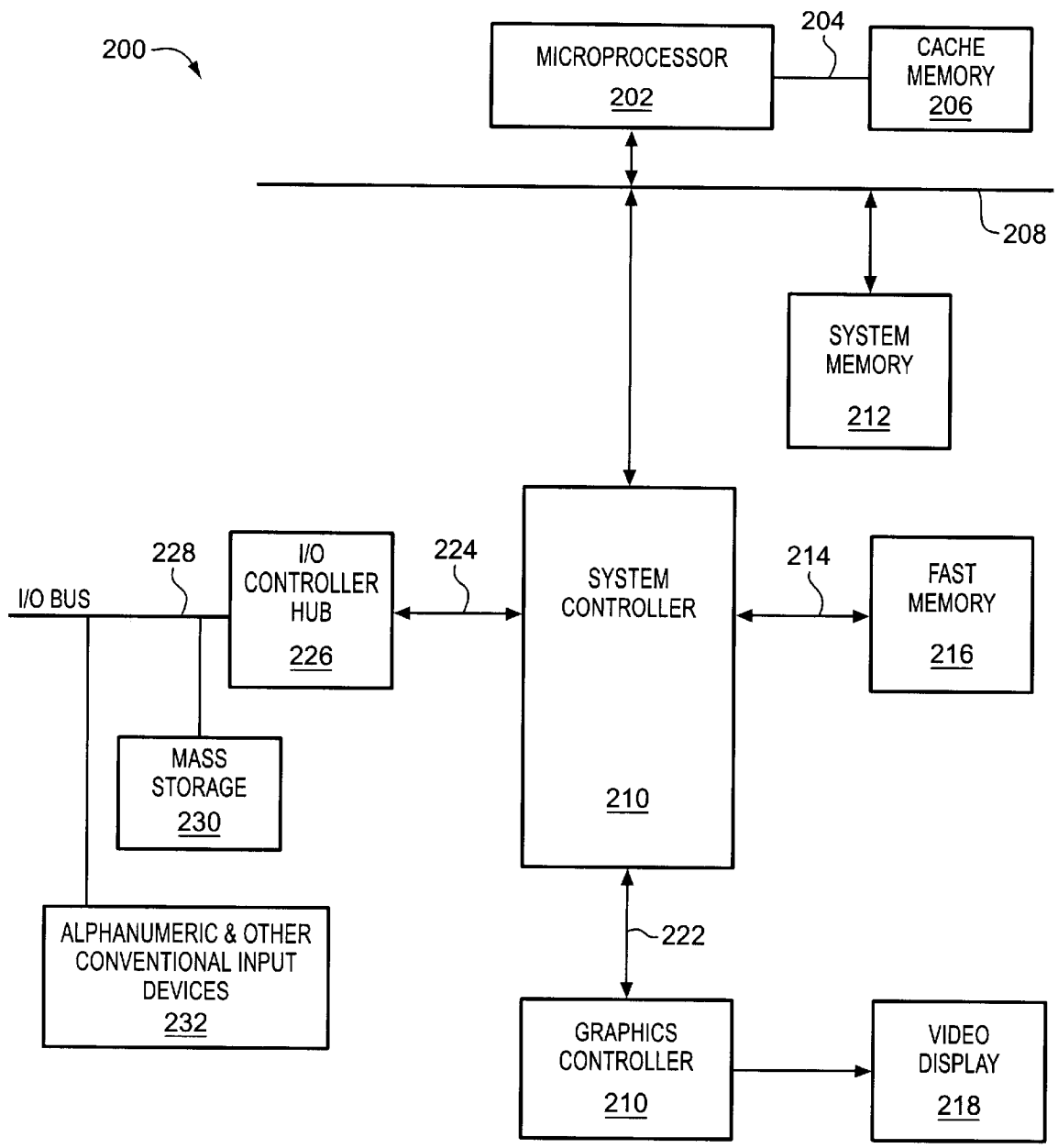
FIG. 2 illustrates a general purpose computer system architecture.

This described connection policy generator 110 often resides in a system controller, which resides in an electronic system. Asserting disabling signal 108 then causes suspension of operations for the system controller. Some examples of the electronic system are, but not limited to, standalone electronic apparatuses and general-purpose computer systems. A general-purpose computer system 200 with system controller 210 is illustrated in FIG. 2.

The general-purpose computer system architecture comprises microprocessor 202 and cache memory 206 coupled to each other through processor bus 204. Sample computer system 200 also includes high performance system bus 208 and standard I/O bus 228. Coupled to high performance system bus 208 are microprocessor 202, system controller 210, and system memory 212. Additionally, system controller 210 is coupled to fast memory 216 through channel 214, is coupled to I/O controller hub 226 through link 224 and is coupled to graphics controller 220 through interface 222. Coupled to graphics controller is video display 218. Coupled to standard I/O bus 228 are I/O controller hub 226, mass storage 230 and alphanumeric input device or other conventional input device 232. These elements perform their conventional functions well known in the art. Moreover, it should have been apparent to one ordinarily skilled in the art that computer system 200 could be designed with multiple microprocessors 202 and may have additional components or more components than that which is shown.

Detailed Operation of One Embodiment of a Connection Policy Generator

The previously discussed connection policy generator 110 enforces a connection policy of a system controller. Using FIG. 2 as an illustration, connection policy generator 110 monitors device identification information on system bus 208. Connection policy generator 110 then issues a disabling signal according to a number of distinct device identifications detected.

Figure 3:
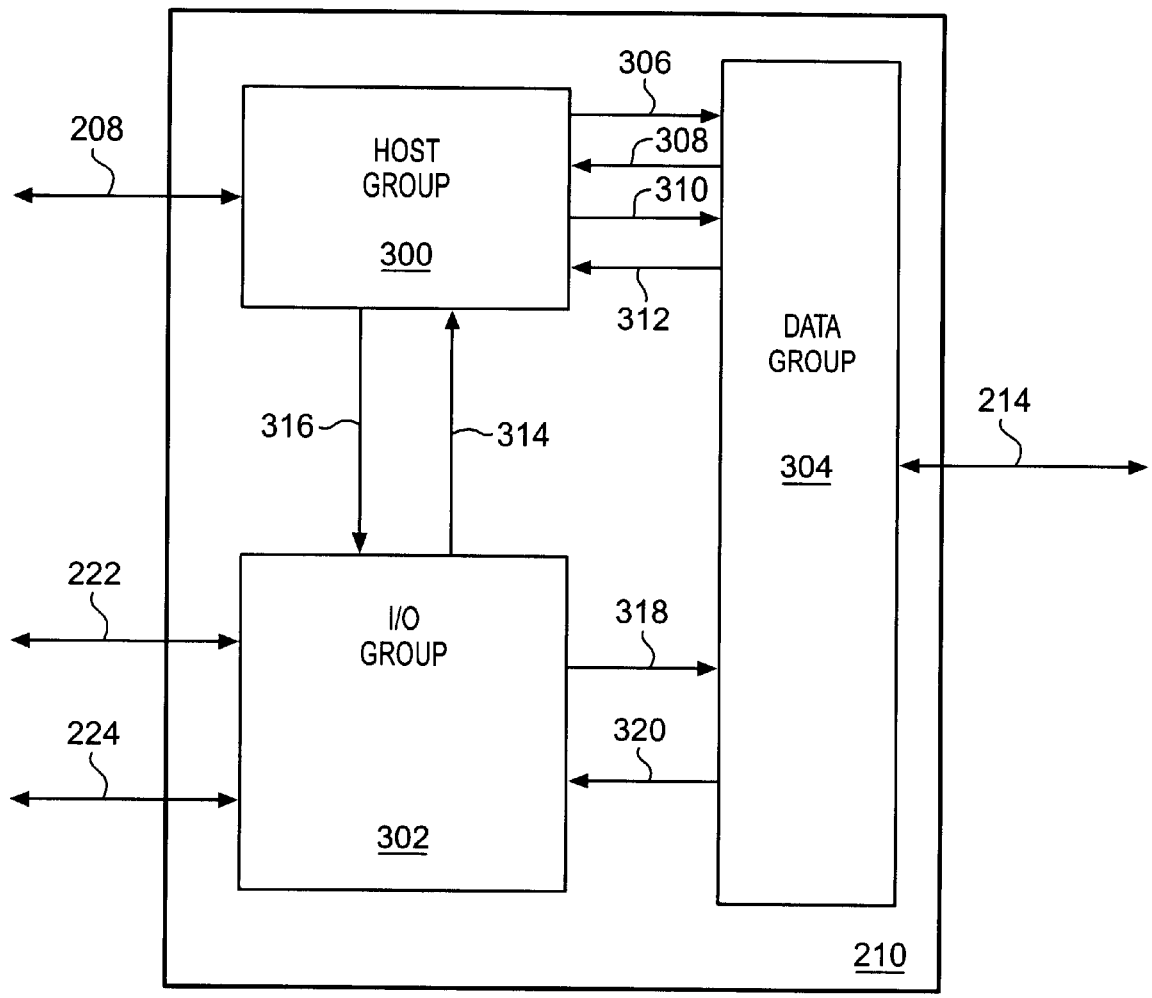
FIG. 3 illustrates one embodiment of a system controller.

FIG. 3 illustrates one embodiment of system controller 210 as shown in FIG. 2. System controller 210 comprises three major groups. They are: host group 300, I/O group 302 and data group 304. In order to elucidate functionality of these groups, the three groups are described in conjunction with FIG. 2. Host group 300 typically comprises I/O buffers that interface directly to system bus 208 and receives requests from system bus 208. Depending upon the addresses presented with these requests, host group 300 forwards the requests to either I/O group 302 or data group 304 through signal 306 or signal 316, respectively. Also, host group 300 sometimes is responsible for initiating snoop requests 310 on behalf of devices. In those situations, these devices normally desire system controller 210 to become a temporary owner to a cache line, which the devices attempt to read from and write to.

I/O group 302, on the other hand, encompasses all of the interfaces to I/O devices such as interface 222 and link 224. As has been mentioned previously, interface 222 provides a direct connection between system controller 210 and graphics controller 220, and link(224 provides a direct connection between system controller 210 and I/O controller hub 226. These direct connections result in dedicated bandwidths for transferring large blocks of data and thus improve overall performance of computer system 200. I/O group 302 also communicates with host group 300 through signals 314 and 316.

Lastly, system controller 210's data group 304 bears the responsibility for dispatching and completing all memory transactions via channel 214. Data group 304 communicates with either host group 300 or I/O group 302 through signals 306–312 or signals 318 and 320, respectively.

Figure 4:
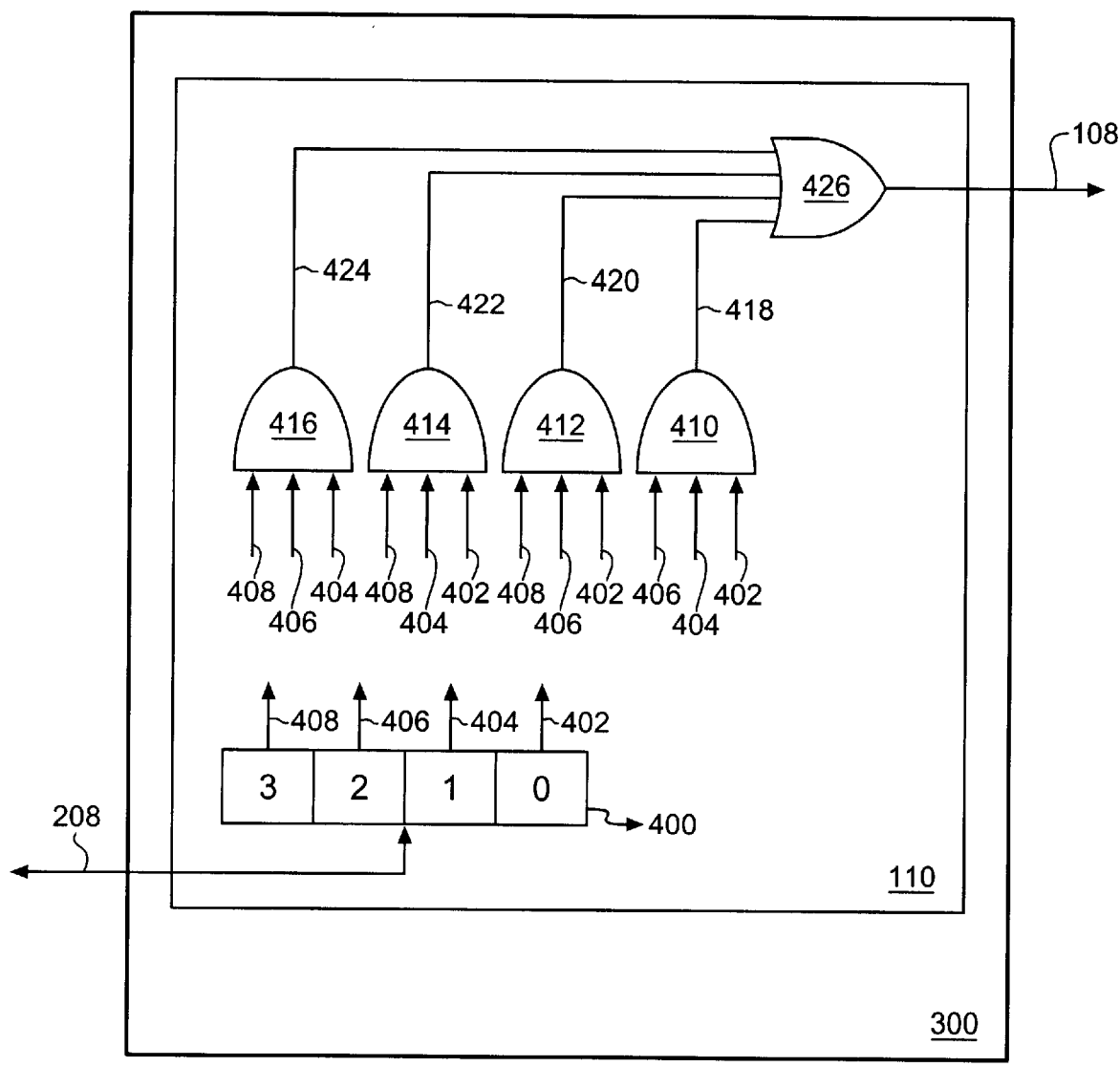
FIG. 4 illustrates a logic diagram of one embodiment of a connection policy generator.

Having described one embodiment of a system controller, connection policy generator 10 may reside in host group 300 and its disabling signal 108 may disable the system controller. FIG. 4 illustrates one embodiment of connection policy generator 110. The embodiment uses register bank 400, logic AND gates 410 to 416 and logic OR gate 426 to produce disabling signal 108 when more than two devices attempt to connect to the system controller. Register bank 400 represents one implementation of tag detector 100 as illustrated in FIG. 2. Each one of register output signals 402, 404, 406 and 408 represents a status signal. For instance, assuming device identifications range from numerical values 0–3 derived from multiple microprocessors 202 are on system bus 208 and assuming tag detector 100 isolates these device identifications, when device identification is detected to be 0, one register out of register bank 400 corresponding to 0 is set. Consequently, register output signal 402 is asserted high. Similarly, whenever particular device identification is identified, an appropriate register from register bank 400 is set and its corresponding register output signal is asserted high.

Moreover, FIG. 4 also demonstrates one embodiment of signal generator 102. In the embodiment, various combinations of register output signals from register bank 400 become inputs to an array of logical AND gates. This embodiment further employs one method of generating the mentioned combinations. Specifically, since device identifications only have four distinct values in the current discussion, only four distinct groups of three such values exist. The four groups are register's output signals 402, 404 and 406, register output signals 402, 406 and 408, output signals 402, 404 and 408 and finally output signals 404, 406 and 408. It is important to note that the numerical values foul and three are for illustration purposes only. It should be apparent to one ordinarily skilled in the art to user other numerical values without exceeding the scope of the disclosed method.

These distinct groups of three output signals become inputs to logical AND gates 410, 412, 414 and 416. Therefore, assertion of any three output signals high leads to asserting at least one of intermediate output signals 418, 420, 422 and 424 high. In other words, when device identifications 0, 1 and 2 are detected, register output signals 402, 404 and 406 are asserted high respectively. With the assertion of 402, 404 and 406, intermediate output signal 418 is also asserted high. When all intermediate output signals of logical AND gates are inputs to logical OR gate 426, as soon as one input to OR gate 426 is asserted high, the output of OR gate 426, or disabling signal 108 as shown in FIG. 1, becomes high as a result. Hence, disabling signal 108 in this embodiment may only remain low when at most two device identifications are detected. Two is also referred to as a threshold number in this instance.

Although a particular embodiment has been described in details to illustrate connection policy generator 110, other designs and implementations can be adopted by one ordinarily skilled in the art without exceeding the scope of the mentioned connection policy generator 110. For instance, instead of using register bank 400 to track four distinct device identifications, register bank 400 can monitor either more or less than four device identifications as long as the arrangements of the logical gates are modified appropriately. Moreover, one skilled in the art may also utilize a counter instead of a combination of register bank 400 and logical gates to determine whether a threshold number has been exceeded. Lastly, the described connection policy generator 110 may apply to devices other than microprocessors.

Figure 5:
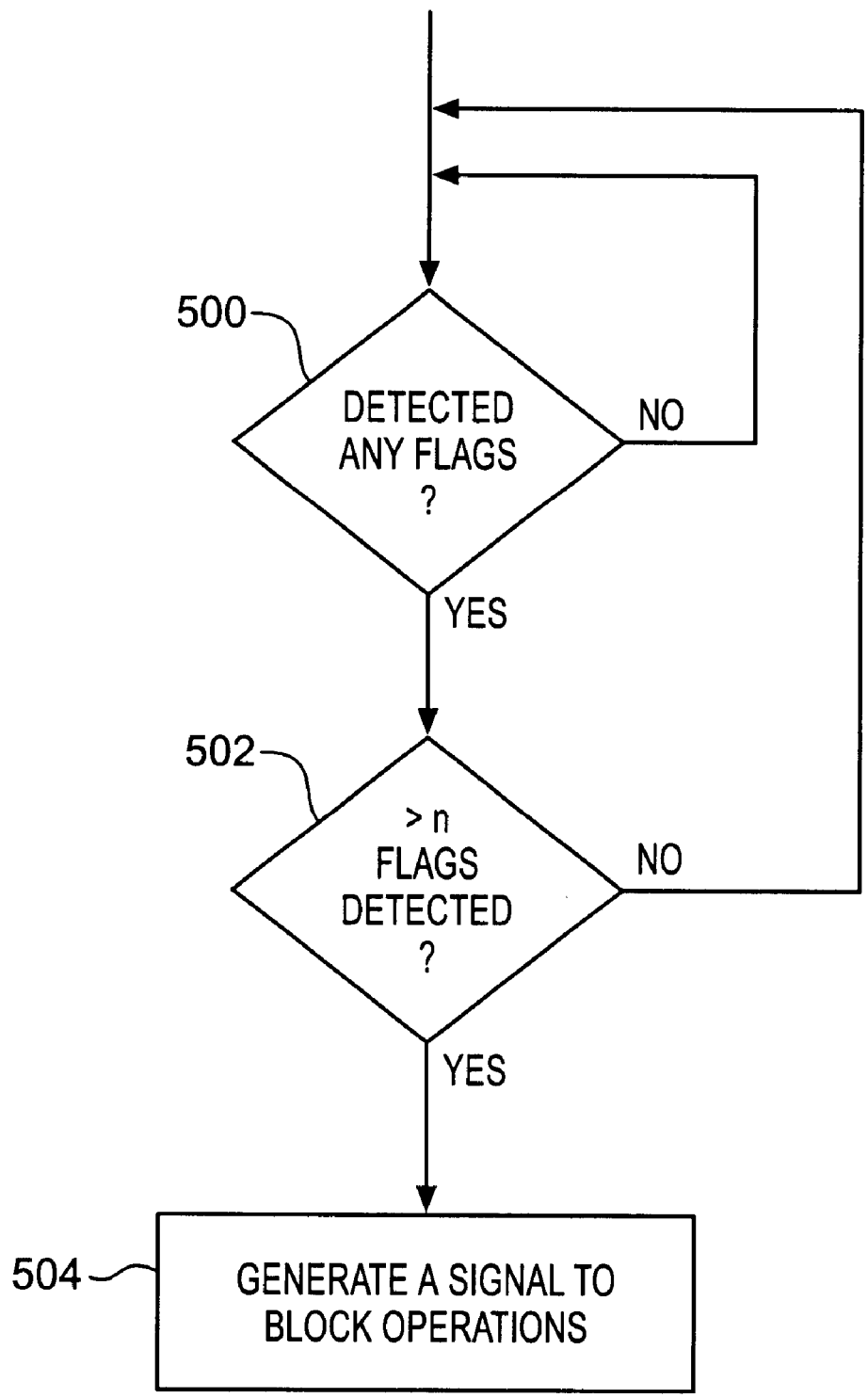
FIG. 5 illustrates a flow chart of a process performed by one embodiment of a connection policy generator.

FIG. 5 demonstrates a flow diagram of a process performed by one embodiment of connection policy generator 110. First, inquiry is made to ascertain whether a tag, or device identification, has been detected in 500. If no tag has been detected, connection policy generator 110's disabling signal 108 remains inactive. On the other hand, when the outcome of 500 is TRUE, connection policy generator 110 tracks the tag and proceeds to verify whether a threshold number has been exceeded in 502. Again, if the inquiry result is false, disabling signal 108 remains low. However, when the threshold number is exceeded in 502, disabling signal 108 is asserted high in 504. Asserting disabling signal 108 has the effect of disabling the system controller monitoring such a signal.

Thus, a method and apparatus of enforcing a connection policy of a system controller have been disclosed. Although the method and apparatus have been described particularly with reference to the figures, the method and apparatus may appear in any number of systems and still perform all the discussed functionality. It is further contemplated that many changes and modifications may be made by one of ordinary skill in the art without departing from the spirit and scope of the disclosure.

What is claimed is:

1. A method of enforcing a connection policy of a system controller, comprising:

monitoring a plurality of distinct device identifications on a bus connected to the system controller;

generating a disabling signal when the number of the device identifications detected on the bus exceeds a predetermined threshold; and disabling the system controller in response to the generation of the disabling signal.

2. The method according to claim 1, wherein monitoring the plurality of distinct device identifications further comprises:

detecting the distinct device identifications; and setting a plurality of registers corresponding to the device identifications.

3. The method according to claim 1, wherein predetermined threshold is two.

4. The method according to claim 2 the disabling signal for the system controller is generated according to the output's of the registers.

5. The method according to claim 4, wherein generating the disabling signal further comprises:

arranging the outputs of the registers in groups of a number equal to the threshold number plus one;

logically ANDing each of the arranged groups to generate intermediate outputs; and logically ORing each of the intermediate outputs to generate the disabling signal.

6. An apparatus comprising:

a tag detector to monitor a plurality of distinct device identifications on a bus connected to a system controller; and a signal generator, coupled to the tag detector, to generate a disabling signal that is transmitted to the system controller to disable the system controller when more than a threshold number of the device identifications have been detected on the bus.

7. The apparatus according to claim 6, wherein the tag detector further comprises:

a plurality of registers to track the corresponding device identifications.

8. The apparatus according to claim 6, wherein the threshold number is two.

9. The apparatus according to claim 7, wherein the signal generator generates the disabling signal for the system controller according to the outputs of the registers.

10. The apparatus according to claim 9, wherein the signal generator in further comprises:

an array of AND gates to receive the outputs of the registers in groups of a number equal to the threshold number plus one; and an OR gate to generate the disabling signal by logically ORing the outputs of the AND gates.

11. An electronic system comprising:

an Input/Output (I/O) bus;

a microprocessor, coupled to the I/O bus; and a system controller, coupled to the I/O bus that comprises:

a tag detector to monitor a plurality of distinct device identifications on the I/O bus; and a signal generator, coupled to the tag detector, to generate a disabling signal that is transmitted to the system controller to disable the system controller when more than a threshold number of the device identifications have been detected on the I/O bus.

12. The electronic system according to claim 11, wherein the tag detector further comprises:

a plurality of registers to track the corresponding device identification.

13. The electronic system according to claim 11, wherein the threshold number is two.

14. The electronic system according to claim 12, wherein the signal generator generates the disabling signal for the system controller according to the outputs of the registers.

15. The electronic system according to claim 14, wherein the signal generator further comprises:

an array of AND gates to receive the outputs of the registers in groups of a number equal to the threshold number plus one; and an OR gate to generate the disabling signal by logically ORing the outputs of the AND gates.

16. A machine readable medium having embodied thereon instructions, which when executed by an electronic system, causing the electronic system to enforce a connection policy of a system controller by:

monitoring a plurality of distinct device identifications on a bus connected to the system controller;

generating a disabling signal when the number of the device identifications detected on the bus exceeds a predetermined threshold; and disabling the system controller in response to the generation of the disabling signal.

17. The machine readable medium according to claim 16, wherein monitoring the plurality of distinct device identifications further comprises:

detecting the distinct device identifications; and setting a plurality of registers corresponding to the device identifications.

18. The machine readable medium according to claim 16, wherein the threshold number is two.

19. The machine readable medium according to claim 17, wherein the disabling signal for the system controller is generated according to the outputs of the registers.

20. The machine readable medium according to claim 19, wherein the instructions for generating the disabling signal further comprises:

arranging the outputs of the registers in groups of a number equal to the threshold number plus one;

logically ANDing each of the arranged groups to generate intermediate outputs; and logically ORing each of the intermediate outputs to generate the disabling signal.

* * * * *

UNITED STATES PATENT AND TRADEMARK OFFICE
CERTIFICATE OF CORRECTION

PATENT NO. : 6,496,894 B1
DATED : December 17, 2002
INVENTOR(S) : Fanning

It is certified that error appears in the above-identified patent and that said Letters Patent is hereby corrected as shown below:

<u>Column 3,</u>
Line 28, delete "10", insert -- 110 --.
Line 60, delete "foul", insert -- four --.

Signed and Sealed this

Twenty-fifth Day of March, 2003

JAMES E. ROGAN
*Director of the United States Patent and Trademark Office*